United States Patent Office 3,646,108
Patented Feb. 29, 1972

3,646,108
FIBRE-FORMING POLYMERS
Edward Barry Jones and John Mather, Harrogate, England, assignors to Imperial Chemical Industries Limited, London, England
No Drawing. Filed Nov. 22, 1966, Ser. No. 596,061
Claims priority, application Great Britain, Sept. 23, 1965, 49,699/65
Int. Cl. C07c 65/20, 69/76, 143/52
U.S. Cl. 260—473 G                    9 Claims

ABSTRACT OF THE DISCLOSURE

A compound of the formula:

R—OC—Ar—O$(CH_2)_n$O—Ar'—
  O$(CH_2)_m$O—Ar"—CO—R where

Ar, Ar' and Ar" are each of any one of the following diradicals:

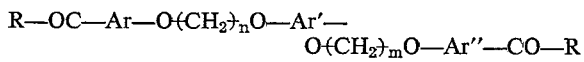

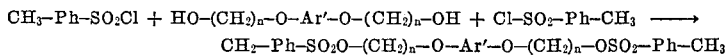

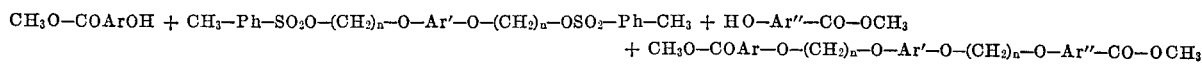

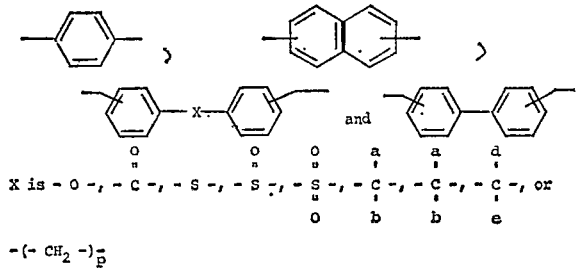

$a$, $b$, $d$ and $e$ are each any one of the substituents —H, —$CH_3$ and —$CH_2H_5$,
R is hydroxy, halogen or alkoxy
$m$, $n$ and $p$ are each an integer which is not less than 2 and not more than 6, and the aromatic ring, or either or both of the aromatic rings, of the diradicals may optionally be substituted in at least one of the free positions, each such substituent being a methyl, ethyl, methoxy, ethoxy or halogen substituent, and polymeric products prepared therefrom. Shaped articles can be prepared from such polymeric products.

The present invention relates to novel intermediates containing associated pairs of bis aryloxy alkane groups, to the use of these novel intermediates in the preparation of polymers and to such polymers.

According to the present invention we provide a compound of the formula:

R—OC—Ar—O$(CH_2)_n$O—Ar'—
  O$(CH_2)_m$O—Ar"—CO—R wherein

Ar, Ar' and Ar" are each any one of the following diradicals:

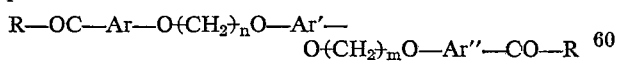

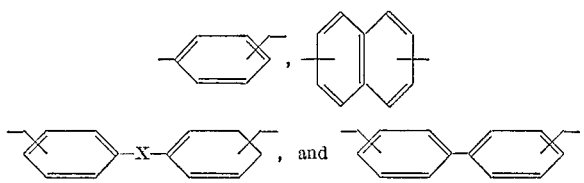

X is

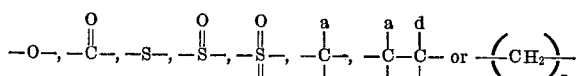

$a$, $b$, $d$ and $e$ are each any one of the substituents —H, —$CH_3$ and —$C_2H_5$,
R is hydroxy, halogen or alkoxy,
$m$, $n$ and $p$ are each an integer which is not less than 2 and not more than 6, and the aromatic ring, or either or both of the aromatic rings, of the diradicals may optionally be substituted in at least one of the free positions, each such substituent being a methyl, ethyl, methoxy, ethoxy or halogen substituent.

The compounds of our invention may be prepared, for example, according to either of the following schemes:

SCHEME I

HO—$(CH_2)_n$—Cl + HO=Ar'—OH + Cl—$(CH_2)_n$—OH ⟶
  HO—$(CH_2)_n$—O—Ar'—O=$(CH_2)_n$—OH

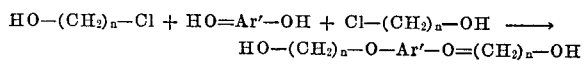

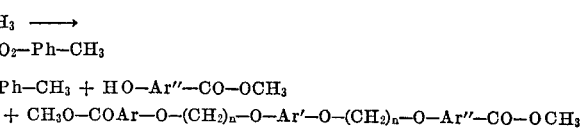

SCHEME II

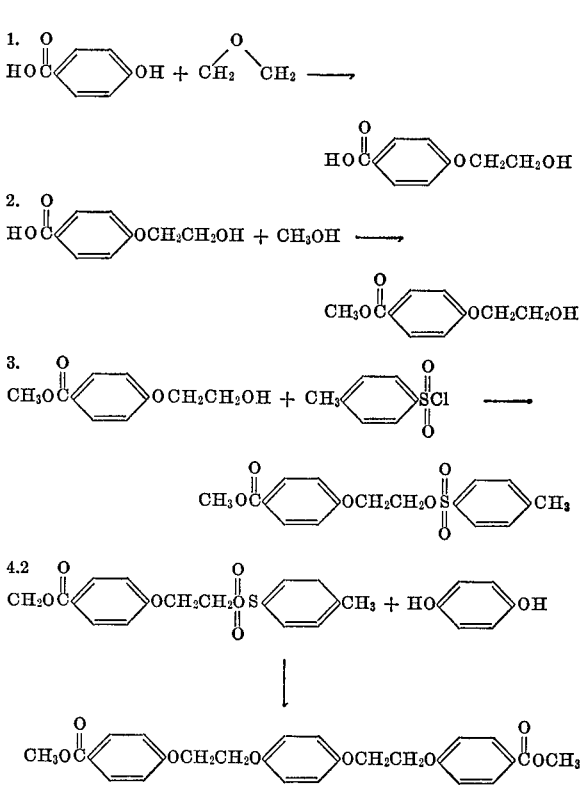

The compounds of our invention may be used as intermediates in the preparation of polymers according to known methods. Thus, for example, polyetheresters may be prepared from the compounds of our invention wherein R is halogen, hydroxy or alkoxy, polyetheramides may be prepared from the compounds wherein R is hydroxy, alkoxy or halogen, polyetheranhydrides may be prepared from the compounds wherein R is hydroxyl, polyether semicarbazides may be prepared from the compounds wherein R is alkoxy and polyether 1:3:4-oxadiazoles may be prepared from the compounds wherein R is halogen.

From the intermediate of the present invention there may be prepared by conventional means a polyetherester of which the repeating unit is of the formula:

—O—R′—OOC—Ar—O(CH₂)ₙO—
    Ar′—O(CH₂)ₘO—Ar″—CO— wherein

Ar, Ar′, Ar″, m and n each have the significance hereinbefore defined and

R′ is a divalent radical such that HO—R′—OH is a glycol or a dihydroxy aromatic compound.

Particularly suitable compounds of the type

HO—R′—OH are HO—(—CH₂—)_q—OH wherein q is an integer not less than 2 and not more than 10, bis-1:4 hydroxymethyl cyclohexane (which may be cis, trans or a mixture of these isomers),

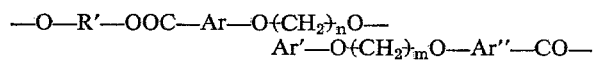

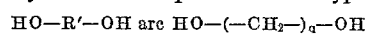

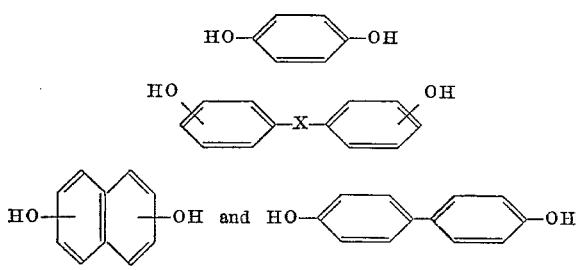

wherein X is as defined hereinbefore.

Copolyetheresters may also be prepared in which in a minor proportion of the units depicted hereinbefore one or more of the symbols Ar, Ar′, A″, n, m and R′ have a different significance from that in the remainder, or in which a proportion of the units may be of formula other than that depicted hereinbefore.

The polyetheresters may be prepared, for example by the reaction at elevated temperature of an ester of the formula:

CH₃OOC—Ar—O(CH₂)ₙO—Ar′—O(CH₂)ₘO—Ar″COOCH₃ with a glycol of the formula HO—R′—OH, all of the symbols having the significance already attributed to them hereinbefore, under ester-interchange conditions in the presence of an ester-interchange catalyst, followed by polycondensation of the ester-interchange product in the presence of a polycondensation catalyst until the desired molecular weight is achieved. The copolyetheresters may be prepared by a similar method wherein a proportion of the ester described is substituted by a second diester and/or a proportion of the glycol is substituted by a second glycol.

From the intermediate of our invention there may be prepared by conventional means a polyether amide of which the repeating unit is of the formula:

wherein R″ is a diradical such that H₂N—R″—NH₂ is a diamine.

Copolyether amides may also be prepared in which in a minor proportion of the units depicted hereinbefore one or more of the symbols Ar, Ar′, Ar″, n, m and R″ may have a significance different from that in the remainder, or in which a proportion of the units may be of formula other than that depicted hereinbefore.

From the intermediate of our invention there may be prepared by conventional means a polyether anhydride of which the repeating unit is of the formula:

—O—CO—Ar—O(CH₂)ₙO—
    Ar′—O(CH₂)ₘO—Ar″—CO— wherein Ar, Ar′ and Ar″, m and n each have significance hereinbefore defined.

Copolyether anhydrides may also be prepared in which in a minor proportion of the units depicted hereinbefore one or more of the symbols Ar, Ar′, Ar″, n and m may have a significance different from that in the remainder, or in which a minor proportion of the units may be of formula other than depicted hereinbefore.

From the intermediate of the present invention there may be prepared by conventional means a polyether 1:3:4-oxadiazole of which the repeating unit is of the formula:

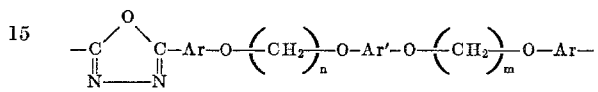

Copolyether 1:3:4-oxadiazoles may also be prepared in which in a minor proportion of the units depicted hereinbefore one or more of the symbols Ar, Ar′, Ar″ n and m have a significance different from that in the remainder, or in which a minor proportion of the units may be of formula other than depicted hereinbefore.

From the intermediate of the present invention there may be prepared by conventional means a polyether semicarbazide of which the repeating unit is of the formula:

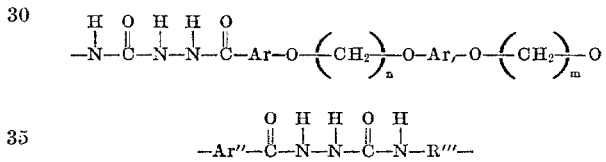

in which R‴ is an alkylene group and Ar, Ar′, Ar″, n and m each have the significance hereinbefore defined.

Copolyether semicarbazides may also be prepared in which in a minor proportion of the units depicted hereinbefore one or more of the symbols Ar, Ar′, Ar″, n, m and R‴ may have a significance different from that in the remainder, or in which a minor proportion of the units may be of the formula other than depicted hereinbefore.

The polymers prepared from the intermediate of our invention when of appropriate molecular weights are suitable for the preparation of moulding; when of appropriate molecular weight and degree of crystallinity they are suitable for melt-spinning to form fibres or extrusion to form mono-filaments or films. The fibres, monofilaments and film may be drawn after formation in order to increase their orientation.

For particular purposes, these polymers may have incorporated into them additives, for example delustrants, colouring materials, light stabilizers, optical brighteners wards dyestuffs. Such additives may be incorporated during the preparation of the polymers or after their preparation is completed.

In order that our invention should be the more perfectly understood we give hereinafter some examples of the preparation of intermediates according to our invention and of the preparation of polymers from them. In these examples all parts are by weight.

(A) PREPARATION OF TOLUENE SULPHONATE INTERMEDIATES

Example A1.—Preparation of 1:4 bis(β-p-toluene sulphonyloxy ethoxy) benzene

A solution of hyroquinone (550 parts), ethylene chlorohydrin (1000 parts) and potassium hydroxide (600 parts) in water (3,500 parts) was stirred at 100° C. in an atmosphere of nitrogen for 6 hours. The product, 1:4 bis (β-hydroxy ethoxy) benzene, was cooled and filtered, and the residue washed with cold water. It was then dried and recrystallized from 1,000 parts of ethyl acetate. M.P. 102–103° C. yield 60%.

Toluene p-sulphonyl chloride (191 parts) was added during 1 hour in small portions to a solution of 1:4 bis (β-hydroxy ethoxy) benzene (99 parts) in pyridine (1,000 parts). The reaction mixture was stirred and kept at 0–10° C. for 2 hours. The product was filtered to remove pyridine hydrochloride and the filtrate was poured into water (2,000 parts) to precipitate the reaction product. This was filtered off, washed firstly with dilute hydrochloric acid (250 parts) and then by water (250 parts) and recrystallized from n-butanol (400 parts). The yield was 182 parts that is 72% of that theoretically obtainable. The melting point of the product was 144–147° C.

Example A2.—Preparation of methyl p-(β-p-toluene sulphonyloxy ethoxy) benzene

A slurry was made of p-hydroxybenzoic acid (408 parts) in water (1,600 parts). To this slurry was added a 20% solution of sodium hydroxide until a neutral homogeneous solution was attained. This solution was cooled to 2° C. in a stoppered vessel fitted with a Bunsen valve and ethylene oxide (215 parts) was added during 5 minutes. The mixture was allowed to stand at room temperature for 18 hours.

The mixture was then heated at 60° C. for 5 hours and refluxed for 1 hour, allowed to cool and acidified with concentrated hydrochloric acid to pH 2. This solution was diluted with water (200 parts), filtered and the residue washed with water (1000 parts) and dried in a vacuum oven at 50° C. for 18 hours.

The resulting β-p-hydroxy ethoxy benzoic acid was obtained in a 90% yield (480 parts), M.P. 174–176° C.

This product was refluxed in methanol (2400 parts) containing a catalytic amount of concentrated sulphuric acid (120 parts) for 18 hours. Excess methanol (2000 parts) was then distilled off and the solution neutralized with sodium bicarbonate. Water (800 parts) was added and the whole extracted with chloroform (2×250 parts and 1×200 parts). The chloroform extract was washed with cold aqueous (10%) sodium hydroxide (3×566 parts) to remove any unreacted acid and then with water (4×500 parts). The chloroform extract was then dried over sodium sulphate and evaporated to dryness. Methyl β-p-hydroxy ethoxy benzoate was obtained in an 84% yield (485 parts), M.P. 67–68° C.

The above product (156 parts) was dissolved in acetone (1900 parts) containing sodium hydroxide (80 parts) and water (160 parts) and the solution chilled to below 5° C. Toluene p-sulphonyl chloride (152 parts) was added and the solution kept between 5° and 10° C. for 3 hours and at 14° C. for 18 hours. The solution was then poured into water (6000 parts) and allowed to stand. The product, methyl p-(β-p-sulphonyloxy ethoxy) benzoate precipitated out initially as an oil which later solidified. The product was filtered off and recrystallized, with carbon treatment, from 60/40 by volume isopropanol/water mixture (15% by weight solution). The product was washed thoroughly with water and dried in a vacuum oven at 50° C. Yield 220 parts (79%), M.P. 65–66° C.

Example A3.—Preparation of 1:4 bis(1-p-toluene sulphonyloxy but-4-oxy) benzene

To a nitrogen purged 70/30 acetone water mixture (300 parts) was added hydroquinone (11 parts) 1:4 bis(p-toluene sulphonloxy) butane (79.6 parts) and potassium carbonate (40 parts) and the whole refluxed for 24 hours. The mixture was then poured into water and the precipitate filtered off and then recrystallized five times from methanol (200) parts with carbon treatments. The resulting white crystalline product (yield 28 parts which is 56% of the theoretical quantity) melted at 70–73° C.

(B) PREPARATION OF POLYMER INTERMEDIATES

Example B1.—Preparation of 1:4 bis(β-p-methoxy carbonyl phenoxy ethoxy)benzene

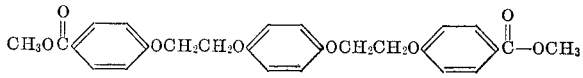

A solution of 1:4 bis(β-p-toluene sulphonyloxyethoxy) benzene (1012 parts) and methyl p-hydroxybenzoate (608 parts) in acetone (2800 parts) and water (1500 parts) was refluxed in the presence of potassium carbonate (640 parts) for 66 hours. The product was poured into water (20,000 parts) and the resulting suspension filtered. The residue was then slurried with hot methanol (8000 parts) filtered hot, and then dried in a vacuum oven at 50° C. The crude product was recrystallized twice from cyclohexanone (10% by weight solution) with carbon treatment. The yield of pure product was 685 parts (77%), M.P. 196–197° C.

Example B2.—Preparation of 1:4 bis(β-p-carboxy phenoxy ethoxy)benzene

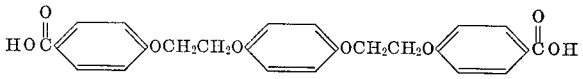

1:4 bis(β-p-methoxy carbonyl phenoxy ethoxy)benzene (173 parts) from Example B1 was added to 1115 parts of ethylene glycol containing sodium hydroxide (40 parts) and the mixture refluxed for 1 hour. The solution was then poured into water (5000 parts) boiled and filtered hot. The filtrate was acidified and filtered and the resulting residue washed with water and dried. The total yield of dicarboxylic acid was 119 parts (65%), M.P. 335–336° C.

Example B3.—Preparation of 1:4 bis(β-p-chlorocarbonyl phenoxy ethoxy)benzene

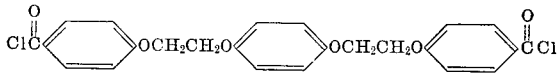

1:4 bis(β-p-carboxyphenoxy ethoxy)benzene (817 parts) from Example B2 was refluxed for 1 hour in thionyl chloride (830 parts) containing NN′ dimethyl formamide (1 part) until all the acid had dissolved. The excess thionyl chloride was distilled off and the residue boiled with benzene (350 parts). The benzene solution was filtered hot and the product crystallised from benzene with carbon treatment. The pure product, yield 59 parts (66%), M.P. 163–165° C., was stored in a desiccator over phosphorus pentoxide.

Example B4.—Preparation of 1:5 bis(β-p-methoxycarbonyl phenoxy ethoxy)naphthalene

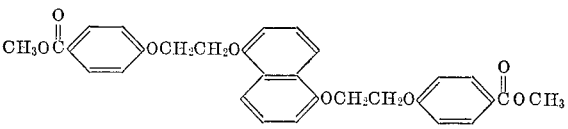

1:5 dihydroxy naphthalene (360 parts) methyl p-(β-p-toluene sulphonyloxy ethoxy) benzoate (1575 parts) and potassium carbonate (870 parts) were dissolved in 5600 parts of a 65/35, by volume, acetone/water mixture and the whole refluxed for 66 hours. The solution was then filtered hot and the crude product recrystallized 4 times, with carbon treatment, from cyclohexanone (as a 10% by weight solution). The pure product was obtained in a 51% yield (469 parts), M.P. 215–215° C.

Example B5.—Preparation of 1:5 bis(β-p carboxy phenoxy ethoxy)naphthalene

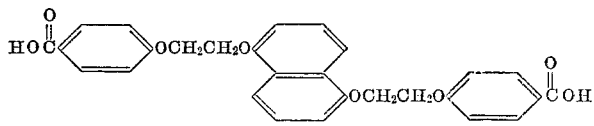

The method of preparation of this dicarboxylic acid was essentially that described in Example B2 using the diester from Example B4. The product was obtained in a 67% yield and melted at a temperature greater than 350° C.

Example B6.—Preparation of 1:5 bis(β-p-chlorocarbonyl phenoxy ethoxy)naphthalene

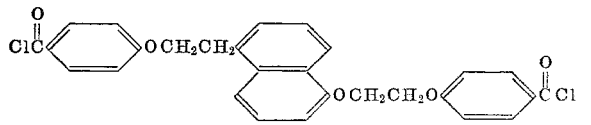

This product was prepared in a manner similar to that described in Example B3 using the dicarboxylic acid prepared as in Example 5. The product was obtained in a 22% yield and melted at 223–226° C.

Example B7.—Preparation of 2:6 bis(β-p-methoxycarbonyl phenoxy ethoxy)naphthalene

This intermediate was prepared in a similar manner to that described in Example B4 and was obtained in a 23.5% yield M.P. 248–259° C.

Example B8.—Preparation of 1:4 bis(β-2-methoxy carbonyl-6-naphthoxy ethoxy)benzene

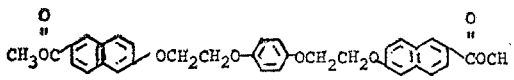

Methyl 2-hydroxy 6-naphthoate (72.8 parts) 1:4 bis(β-p-toluene sulphonyloxy ethoxy) benzene (101.2 parts) and potassium carbonate (77.3 parts) were dissolved in 1500 parts of a mixture of equal parts, by volume, of acetone and water and the mixture refluxed for 18 hours. The resulting mixture was poured into acetone (800 parts) and the precipitate filtered off, washed with acetone (200 parts) and dried. The crude product was purified by recrystallizing from NN' dimethyl formamide. The purified product, which was 1:4 bis(β - 2 - methoxy-carbonyl-6-naphthoxy ethoxy) benzene melted at 255–257° C. The yield of the purified product was 25.2 parts (22%).

Example B9.—Preparation of pp'-bis(β-p-methoxy carbonyl phenoxy ethoxy)diphenyl

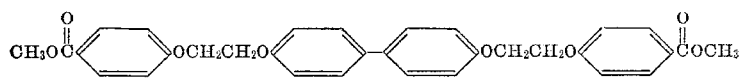

pp'-Dihydroxy diphenyl (36 parts), methyl p-(β-p-toluene sulphonyloxy ethoxy) benzoate (140 parts) and potassium carbonate (77.3 parts) were dissolved in 1000 of a 65/35, by volume, dioxan/water mixture and the whole refluxed for 18 hours. The solution was then poured into 800 parts of acetone, filtered and the residue dried. The crude product was extracted with 1400 parts cyclohexanone and the resulting solution allowed to cool and the precipitate which separated out was filtered off and dried. This product was further purified by recrystallizing with carbon treatment, from cyclohexanone (950 parts). The pure produce which was obtained in a 42% yield (46 parts) melted at 242–244° C.

Example B10.—Preparation of pp'-bis(β-p-n-butyloxy carbonylphenoxy ethoxy)diphenyl

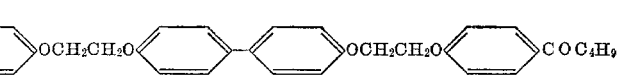

pp' - Bis(B-p-methoxy carbonyl phenoxy ethoxy) diphenyl (5.42) parts) from Example B9 was added to n-butanol (24 parts) containing titanium t-butoxide (0.05 parts of a 1% solution in t-butanol) and a trace of antioxidant bis(2 - hydroxy-3α-methyl cyclohexyl-5-methyl)-phenyl methane in a pressure tube. The tube was purged with nitrogen, sealed and then heated at 250° C. for 2 hours. The resulting n-butyl ester was recrystallized from dioxan and melted at 189–190° C.

Example B11.—Preparation of pp'-bis(β-p-methoxy carbonyl phenoxy ethoxy) diphenyl sulfone

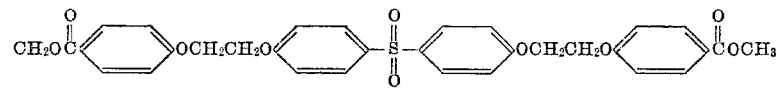

pp'-Dihydroxy diphenyl sulphone (50 parts) methyl p-(β-p-toluene sulphonyloxy ethoxy) benzoate (140 parts) and potassium carbonate (77.3 parts) were dissolved in 1500 parts of a mixture of equal parts, by volume, of acetone and water and the mixture was refluxed for 18 hours. On cooling the resultant solution, a product recrystallized out which was filtered off and dried. The product, which was pp'-(β-p-methoxy carbonyl phenoxy ethoxy) diphenyl sulphone was purified by recrystallization from 500 parts of a mixture of equal parts, by volume, of acetone and water. The purified product, M.P. 132–135° C., was obtained in a 34% yield (41 parts).

Example B12.—Preparation of 1:4 bis(β-p-methoxy carbonyl-o-methoxy phenoxy ethoxy) benzene

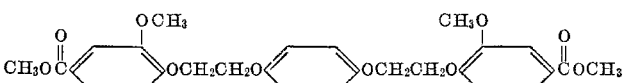

Redistilled methyl vanillate (34.2 parts) 1:4 bis(β-p-toluene sulphonyloxy ethoxy) benzene (50.6 parts) were refluxed in 500 parts of a 65/35 acetone water mixture containing potassium carbonate (38.7 parts) for 72 hours. The solution was allowed to cool and the solid filtered off, washed with water and methanol and dried. This crude product was recrystallized, with carbon treatment, from n-butanol (400 parts) and again, as a 15% by weight solution, from NN' dimethyl formamide. The pure product was obtained in a 45% yield (2.5 parts) and melted at 178–179 C.

Example B13.—Preparation of 1:4 bis(β-p-carboxy-o-methoxy phenoxy ethoxy)benzene

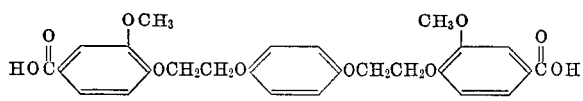

This product was prepared in a manner similar to that described in Example B2 using the diester prepared as in Example B12. The final product, which was 1:4 bis(β-p-carboxy-o-methoxy phenoxy ethoxy) benzene was obtained in a 44.5% yield and melted at 252–254° C.

Example B14.—Preparation of 1:4 bis(β-p-chlorocarbonyl-o-methoxy phenoxy ethoxy)benzene

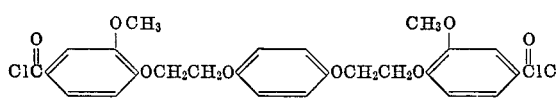

The method of preparation of this diacid chloride was essentially that described in Example B3 using the dicarboxylic acid prepared as in Example B13. The final product melted at 145–150° C. and was obtained in a 35.8% yield.

Example B15.—Preparation of 1:4 bis(1-p-methoxy carbonyl phenoxy but-4-oxy) benzene

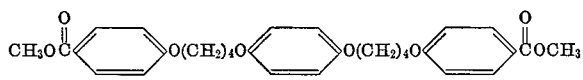

A solution of methyl p-hydroxybenzoate (15.5 parts), 1:4 bis(1-p-toluene sulphonyloxy but-4-oxy) benzene (28 parts) and potassium carbonate (18 parts) in acetone (190 parts) and water (60 parts) was refluxed for 60 hours. The solution was then filtered and the residue washed with water and acetone. The crude product was recrystallized from NN' dimethyl formamide (400 parts) and cyclohexanone (475 parts). The pure product, yield 60 parts (23%) melted at 176–177° C.

Example B16.—Preparation of 1:4 bis(β-p-hydrazo carbonyl phenoxy ethoxy)benzene

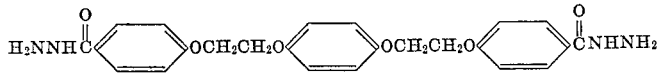

1:4 bis(β-p-methoxy carbonyl phenoxy ethoxy) benzene was initially converted to its dibutyl ester in a manner similar to that described in Example B10. The product, which was obtained in a quantitative yield, melted at 146–147° C.

The dibutyl ester (40 parts) was then dissolved in n-butanol (400 parts) at a temperature of 100–105° C., and to this hot solution was added hydrazine hydrate (100 parts of a 98–100% solution). The mixture was then refluxed for 17 hours. The resulting precipitate was filtered off, washed with acetone and dried. The crude product was purified by recrystallization from NN' dimethyl formamide (900 parts). The pure product, which was 1:4 bis(β-p-hydrazo carbonyl phenoxy ethoxy) benzene was obtained in a 42.5% yield (18.2 parts) and melted at 273–276° C.

(C) PREPARATION OF POLYETHERESTERS

Polycondensation of 1:4 bis(β-p-methoxy carbonyl phenoxy ethoxy benzene with ethylene glycol

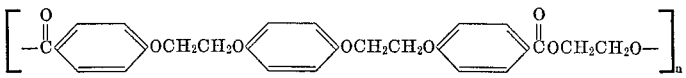

A mixture of 1:4 bis(β-p-methoxy carbonyl phenoxy ethoxy) benzene (485 parts), prepared as in Example B1, ethylene glycol (200 parts) and titanium t-butoxide (11.6 parts of a 1% solution in t-butanol) plus an antioxidant bis(2 - hydroxy-3-α-methylcyclohexyl-5-methyl) phenyl methane (2.5 parts) was heated at 200° C. in a slow stream of nitrogen. When the theoretical quantity of methanol had distilled off, the temperature was raised to 240–250° C. to distill off the excess ethylene glycol. The mass was then heated in a slow stream of nitrogen at 0.1 mm. Hg. and 284° C. for 3 hours, after which time a viscous polymer was obtained. The polymer, which was fibre forming and highly crystalline, melted in the range 225–228° C. The polymer had a relative viscosity (measured as a 1% solution in dichloro acetic acid at 25° C.) of 1.69.

Example C2.—Polycondensation of 1:4 bis(β-p-methoxy carbonyl phenoxy ethoxy) benzene with 1:4 butane diol

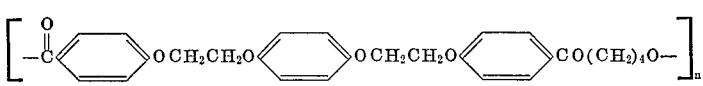

This polymerisation was carried out in a manner essentially similar to that described in Example C1 using the diester prepared as in Example B1 and 1:4 butane diol. The final polymer had a viscosity ratio of 1.94 (measured as a 1% solution in ortho chlorophenol at 25° C.) and melted in the range 215–219° C. Highly crystalline fibre could be pulled from the melt.

Example C3.—Polycondensation of 1:4 bis(1-p-methoxy carbonyl phenoxy but-4-oxy) benzene and ethylene glycol

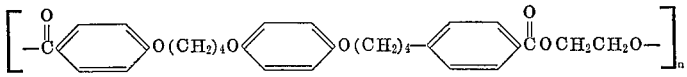

The procedure followed in this example was similar to that described in Example C1 using the diester prepared as in Example B15. The polymer, which was crystalline and fibre forming, had a relative viscosity of 1.79 (measured as a 1% solution in dichloro acetic acid at 25° C.). The polymer melted in the range 190–195° C.

Example C4.—Polycondensation of 1:4 bis (β-methoxy carbonyl phenoxy ethoxy benzene and 1:4 cyclohexane dimethanol, 80/20 trans/cis isomer

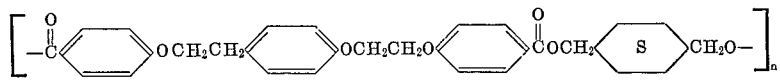

The above diester (4.29 parts), prepared as described in Example B1, was added to a large excess of 1:4 cyclohexane dimethanol, 80/20 trans/cis isomer (7 parts) containing, as catalyst, titanium t-butoxide (0.08 part of a 1% solution in t-butanol) and a trace of antioxidant methane in a pressure tube. The tube was purged with nitrogen, sealed and then heated at 250° C. for 4 hours.

After cooling, the mixture was transferred to a polymerisation vessel and heated at 284° C. to remove the excess diol. A vacuum of 0.01 mm. Hg was then applied for 2 hours. The resulting polymer was highly crystalline and fibre forming. It had a viscosity ratio of 1.65 (as a 1% solution in dichloroacetic acid at 25° C.) and melted in the range 252–256° C.

Example C5.—Polycondensation of 1:4 bis(β-p-methoxy carbonyl phenoxy ethoxy) benzene and 1:4 cyclo hexane dimethanol, trans isomer

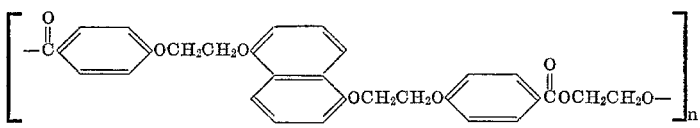

The procedure described in Example C4, but using the all trans isomer of 1:4 cyclohexane dimethanol, was followed. The crystalline, fibre forming, polymer melted at 262–264° C. and had a viscosity ratio of 1.81 (1% solution in dichloroacetic acid at 25° C.).

EXAMPLE C6.—Polycondensation of 1:5 bis(β-p-methoxy carbonyl phenoxy ethoxy naphthalene and ethylene glycol

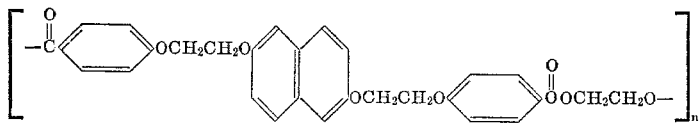

An ester interchange was carried out between 1:5 bis-(β-p-methoxy carbonyl phenoxy ethoxy) naphthalene (44.5 parts), prepared as in Example B4, and ethylene glycol (165 parts) using a zinc acetate catalyst (0.009 part) at 200° C. under an atmosphere of nitrogen. When the theoretical quantity of methanol had distilled off, phosphorous acid was added in a quantity sufficient to neutralise the ester interchange catalyst and then, after a delay of 5 minutes, antimony oxide (0.018 part) was added. Excess ethylene glycol was distilled off and the mass heated at 285° C. for 2 hours under a reduced pressure of nitrogen (0.05 mm. Hg).

The resulting polymer was crystalline and melted in the range 252–256° C. Strong fibres could be pulled from the melt. The polymer had a relative viscosity (measured as a 1% solution in ortho chloro phenol at 25° C.) of 1.63.

EXAMPLE C7.—Polycondensation of 1:5 bis(β-p-methoxy carbonyl phenoxy ethoxy naphthalene and 1:4 butane diol

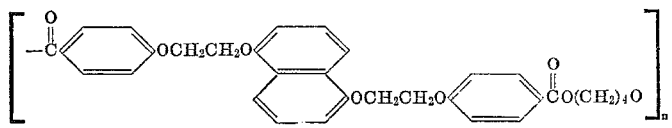

The procedure described in Example C2 was followed using the diester prepared as in B4 but using a calcium acetate, phosphorous acid, antimony oxide catalyst system. The final polymer had a viscosity ratio of 1.20 (measured as a 1% solution in orthochlorophenol at 25° C.).

EXAMPLE C8.—Polycondensation of 1:5 bis(β-p-methoxy carbonyl phenoxy ethoxy) naphthalene and 1:4 cyclohexane dimethanol, 80/20 trans/cis isomer

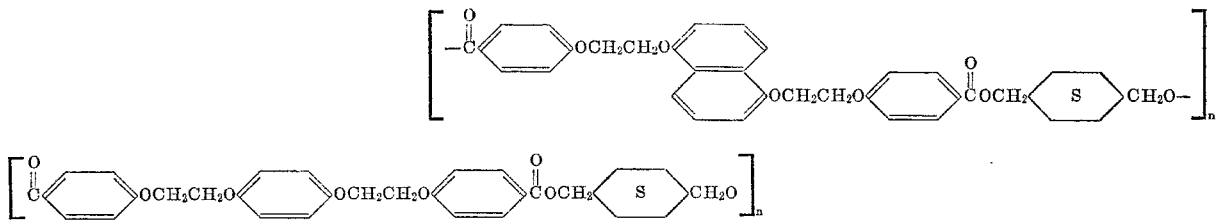

The procedure described in Example C4 was followed using the diester prepared as in Example B4. The polymer formed, had only a low degree of crystallinity although a marked increase in crystallinity was attained by annealing at 200° C. for 30 minutes. The resulting crystalline melting point was in the range 242–245° C. The polymer, which was fibre forming, had a viscosity ratio (1% solution in dichloroacetic acid at 25° C.) of 1.49.

EXAMPLE 9C.—Polycondensation of 2:6 bis(β-p-methoxy carbonyl phenoxy ethoxy naphthalene and ethylene glycol

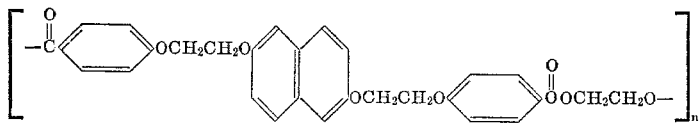

The procedure described in Example C6 was followed using the diester prepared as in Example B7 except that the polymerisation temperature was 305° C. The resulting polymer was highly crystalline and melted in the range 282–285° C. The polymer was insoluble in ortho chloro phenol and dichloroacetic acid. Strong fibres could be pulled from the melt.

EXAMPLE C10.—Polycondensation of 1:4 bis(β-p-methoxy carbonyl-6-naphthoxy ethoxy) benzene and 1:4 cyclohexane dimethanol, 80/20 trans/cis isomer

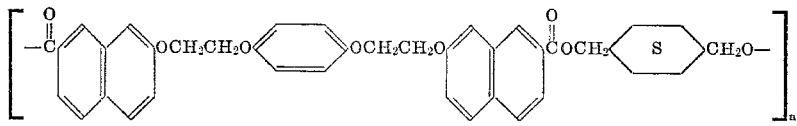

The procedure described in Example C4 was followed using the diester prepared as in Example B8 except that the polymerisation temperature used was 305° C. The resulting very highly crystalline polymer melted at 273–276° C. and was insoluble in the normal solvents for polyesters.

EXAMPLE C11.—Polycondensation of pp'-bis(β-p-n-butyloxy carbonyl phenoxy ethoxy) diphenyl and ethylene glycol

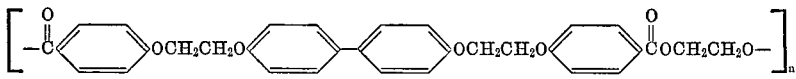

The polycondensation was carried out in a manner essentially similar to that described in Example C1 using the dibutylester from Example B10. The resulting polymer was very highly crystalline (M.P. 274–276° C.) and was insoluble in normal solvents for polyesters.

Example C12.—Polycondensation of pp' bis(β-p-methoxy carbonyl phenoxy ethoxy)diphenyl and 1:4 butane diol

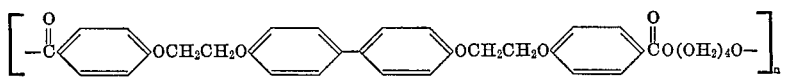

The procedure described in Example C2 was followed using the dimethyl ester prepared as in Example B9. The resulting polymer was very highly crystalline, M.P. 273–276° C., and was insoluble, at room temperature, in normal solvents for polyesters.

Example C13.—Polycondensation of pp' bis(β-p-methoxy carbonyl phenoxy ethoxy)diphenyl and 1:4 cyclohexane dimethanol, 80/20 trans/cis isomer

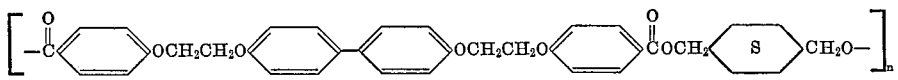

The procedure used was similar to that described in Example C4, using the dimethyl prepared as in Example B9, except that the polymerisation was carried out at 305° C. The resulting crystalline, fibre forming, polymer melted in the range 269–273° C. and had a viscosity ratio (1% solution in dichloroacetic acid at 25° C.) of 1.61.

Example C14.—Polycondensation of pp' bis(β-p-methoxy carbonyl phenoxy ethoxy) diphenyl sulphone and ethylene glycol

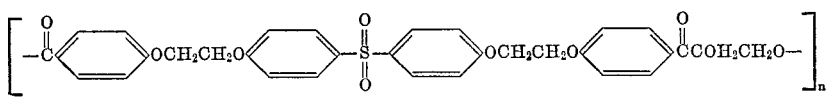

The procedure described in Example C1 was followed using the diester prepared as in Example B11. The resulting polymer was amorphous and fibres drawn from the melt exhibited severe shrinkage in the range 115–125° C. The viscosity ratio of the polymer was 1.46 (1% solution in dichloroacetic acid at 25° C.).

Example C15.—Polycondensation of 1:4 bis(β-p-methoxy carbonyl-o-methoxy phenoxy ethoxy)benzene and ethylene glycol

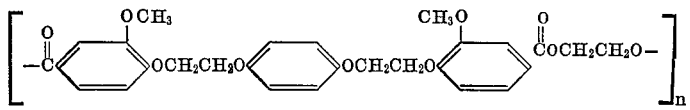

The polycondensation was carried out in a manner essentially similar to that described in Example C1 using the diester prepared as in Example B12. The resulting polymer was amorphous and the fibres pulled from the melt exhibited severe shrinkage in the region 55–75° C. The polymer had a relative viscosity of 1.75 (1% solution in ortho chlorophenol at 25° C.).

(D) PREPARATION OF POLYETHERAMIDES

Example D1.—Polycondensation of 1:4 bis(β-p-chloro carbonyl phenoxy ethoxy)benzene and hexamethylene diamine

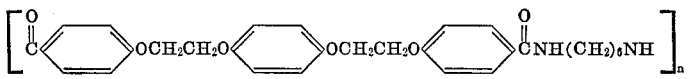

The above diacid chloride (2.071 parts) prepared as described in Example B3, in dry cyclohexane (80 parts) was added to an aqueous solution of hexamethylene diamine (9.929 parts of an 0.8722 N solution) in water (100 parts) containing sodium lauryl sulphate (0.5 part)

with very good agitation. The mixture was rapidly agitated for 15 minutes and then poured into acetone. The precipitated polymer was filtered off, washed and dried. The polymer, which was crystalline and fibre forming, melted in the range 310–318° C. and had a viscosity ratio of 1.37 (measured as a 1% solution in m-cresol).

Example D2.—Polycondensation of 1:5 bis(β-p-chloro methoxy phenoxy ethoxy)naphthalene and hexamethylene diamine volume of the acetic acid/acetic anhydride distillate was 30 parts. The reaction temperature was then raised to 283° C. and the excess acetic anhydride distilled out. A vacuum of 0.1 mm. Hg was then applied and the melt rapidly thickened. The resulting polymer was amorphous but could be crystallised by annealing at 140° C. for 3 hours. The crystalline melting point of the polymer was in the range 210–222° C. Strong fibres could be pulled from the melt.

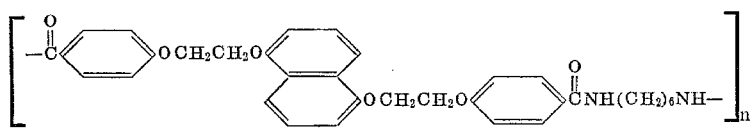

The procedure described in Example D1 using the diacid chloride prepared as in Example B6 was followed. The resulting crystalline polymer melted over the range 285–325° C. and had a viscosity ratio of 1.16 (1% solution in m-cresol at 25° C.).

Example D3.—Polycondensation of 1:4 bis(β-p-chloro carbonyl-o-methoxy phenoxy ethoxy)benzene and hexamethylene diamine Example E2.—Polyether anhydride from 1:5 bis(β-p-carboxy phenoxy ethoxy) naphthalene and acetic anhydride

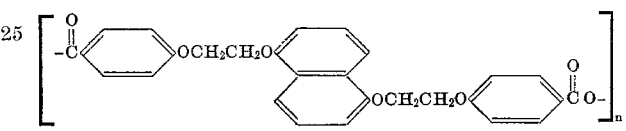

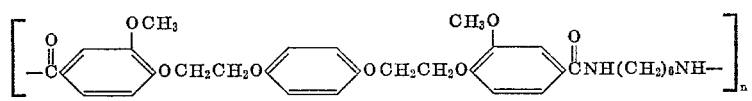

The procedure described in Example D1 was followed using the diacid chloride prepared as in Example B14. The resulting crystalline polymer melted in the range 174–176° C. and had a relative viscosity (1% solution in m-cresol at 25° C.) of 1.22.

(E) PREPARATION OF MISCELLANEOUS POLYMERS

Example E1.—Polyether anhydride from 1:4 bis(β-p-carboxy phenoxy ethoxy)benzene and acetic anhydride

A suspension of the above dicarboxylic acid (2.19 parts), prepared as in Example B2, in acetic anhydride (11 parts) was heated at 222° C. in a nitrogen atmosphere. Acetic acid was produced and distilled out together with some unreacted acetic anhydride. Fresh acetic anhydride was continually added to the mixture until the total The procedure described in Example E1, using the dicarboxylic acid prepared as in Example B5, was essentially followed except that the dianhydride initially formed was twice recrystallised, with carbon treatment, from fresh acetic anhydride. The dianhydride was then polymerized in the normal manner. The final polymer was fibre forming and amorphous although it could be crystallized by heating at 140° C. for 3 days. The crystalline melting point of the polymer was in the range 289–291° C.

Example E3.—Polyether 1:3:4 oxadiazole from 1:4 bis(β-p-hydrazo carbonyl phenoxy ethoxy) benzene and sebacoyl chloride)

The polyetherhydrazide was formed initially and then converted, by heat, to the polyether 1:3:4 oxadiazole

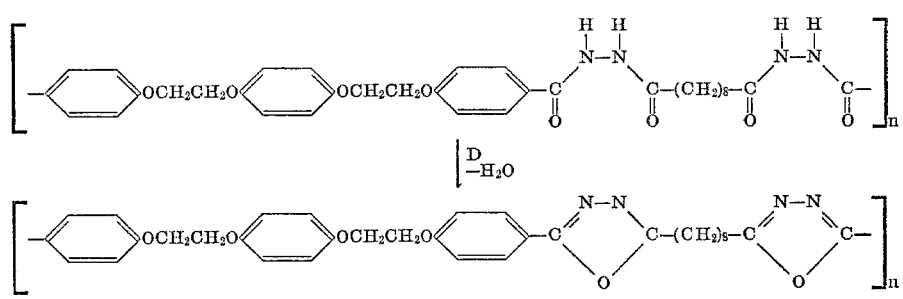

1:4 bis(β-p-hydrazo carbonyl phenoxy ethoxy) benzene (4.66 parts), prepared as in Example B16, was dissolved in hexamethyl phosphoramide (50 parts—dried over molecular sieves). The solution was then cooled to 10° C.

and freshly distilled sebacoyl chloride (2.39 parts in 10 parts dry hexamethylphosphoramide) added over 10 minutes. The solution was then stirred at room temperature for 18 hours. After this time, the viscosity of the solution had increased considerably and also some precipitation had occurred. The solution was then poured into water and the precipitated polyetherhydrazide filtered off, washed with water and acetone and dried in a vacuum oven at 50° C. The polyetherhydrazide melted in the range 284–288° C.

The polyether hydrazide was then converted to the polyether 1:3:4 oxadiazole by heating at 259° C. for 4½ hours at 0.5 mm. Hg. The resulting polymer melted in the range 190–195° C. and had a viscosity ratio (1% solution in ortho chloro phenol at 25° C.) of 1.82.

Example E4.—Polyethersemicarbazide from 1:4 bis($\beta$-p-hydrazo carbonyl phenoxy ethoxy) benzene and hexamethylene diisocyanate

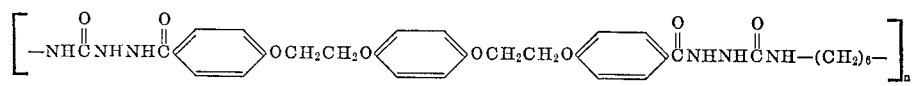

1:4 bis($\beta$-p-hydrazo carbonyl phenoxy ethoxy) benzene (2.49 parts) and hexamethylene diisocyanate (0.83 part) were dissolved at 50° C. in freshly distilled dimethyl sulphoxide (100 parts). The mixture was further heated at 100–110° C. for 2 hours and then allowed to cool. The resulting clear solution was poured into water and the precipitated polyether semicarbazide filtered off, washed with water and acetone and dried. The polymer, which was crystalline, melted in the range 265–282° C. and had a viscosity ratio (1% solution in dimethyl sulphoxide at 25° C.) of 1.26.

(F) FIBRE PROCESSING AND PHYSICAL PROPERTIES

Example F1.—Fibre processing of polycondensate of 1:4 bis($\beta$-p-methoxy carbonyl phenoxy ethoxy) benzene and ethylene glycol A sample of the polymer described above prepared as in Example C1 was melt spun at 230° C. on a micro rod spinner. The single filament was wound up at 400 ft./minute and subsequently drawn to 5 times its original length over a heated pin at 90° C. and a heated plate at 160° C. This drawn fibre, denier 10:5, density 1.341, had an initial modulus of 186 grams per denier, a breaking tenacity of 6.36 grams per denier and a breaking elongation of 5.1%.

The drawn yarn (heat set at 135° C. for 30 minutes) had a second order transition (Tg) at 88° C. and an optical birefringence of 227×10$^{-3}$ (97.5% of calculated theoretical maximum). The second order transition temperature was determined by a dynamic mechanical technique at 10 cycles per second.

Example F.2.—Fibre processing of the polycondensate of 1:4 ($\beta$-p-methoxy carbonyl phenoxy ethoxy) benzene—and1:4 cyclohexane dimethanol, 80/20 trans/cis isomer A sample of the polymer described above, prepared as in Example C4, was melt spun on a micro rod spinner at 250° C. The single filament was wound up at 300 feet per minute and subsequently drawn to 3.5 times its original length over a heated pin at 60° C. and a heated plate at 105° C. This drawn fibre, denier 13.8, had an initial modulus of 64.5 grams per denier, a breaking tenacity of 2.22 grams per denier and a breaking elongation of 13.8%.

Example F3.—Fibre processing of the polycondensate of 1:4 bis($\beta$-p-methoxy carbonyl phenoxy ethoxy) benzene and 1:4 cyclohexane dimethanol, all trans isomer A sample of the above polymer prepared as in example C5 was melt spun on a micro rod spinner at 263° C. The single filament was wound up at 300 feet per minute and subsequently drawn to 4 times its original length over a heated pin at 60° C. and a heated plate at 105° C. This drawn fibre, denier 11.3 had an initial modulus of 67 grams per denier, a breaking tenacity of 2.84 grams per denier and a breaking elongation of 13.2%.

The drawn fibre (heat set at 160° C. for 30 minutes) had a second order transition temperature (Tg) of 130° C.

Example F4.—Fibre processing of the polycondensate of 1:5 bis($\beta$-p-methoxy carbonyl phenoxy ethoxy) naphthalene and ethylene glycol A sample of the polymer described above prepared as in Example C6 was melt spun at 272° C. on a red spinner. The single filament was wound up at 400 feet per minute and subsequently drawn to 5 times its original length over a heated pin at 80° C. and a heated plate at 175° C. This drawn fibre, denier 7.8, density 1.323, had an initial modulus of 104 grams per denier, breaking tenacity of 5.6 grams per denier and breaking elongation of 10.3%. The spun yarn, density 1.280, had a second order transition temperature (Tg) of 117° C. whilst the drawn yarn (heat set at 200° C. for 10 minutes) had a second order transition temperature of 166° C. The optical birefringence of the spun yarn was 176×10$^{-3}$ (66.5% of the theoretical maximum).

Example F5.—Fibre processing of the polycondensate of 2:6 bis($\beta$-p-methoxy carbonyl phenoxy ethoxy) naphthalene and ethylene glycol A sample of the polymer described above prepared as in Example C9 was melt spun at 295° C. on a micro-rod spinner. The single filament was wound up to 400 ft./minute and subsequently drawn to twice its original length over a heated pin at 120° C. and a heated plate at 210° C. This drawn fibre, denier 15.6 had an initial modulus of 71.5 frams per denier, a breaking tenacity of 2.44 grams per denier and a breaking elongation of 14.6%.

What is claimed is:

1. A compound of the formula:

R—OC—Ar—O(CH$_2$)$_n$O—Ar'—O
                                          (CH$_2$)$_m$O—Ar"—CO—R where Ar, Ar' and Ar" are each of any one of the following diradicals:

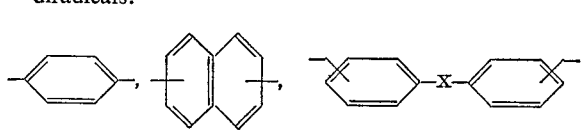

and

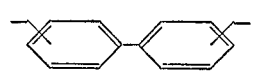

X is

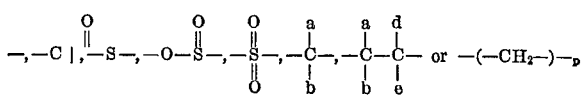

$a$, $b$, $d$ and $e$ are each any one of the substituents —H, —CH$_3$ and —C$_2$H$_5$, R is lower alkoxyl, $m$, $n$ and $p$ are each an integer which is not less than 2 and not more than 6, and the aromatic ring, or either or both of the aromatic rings, of the diradicals may optionally be substituted in at least one of the free positions, each such substituent being a methyl, ethyl, methoxy, ethoxy or halogen substituent.

2. The product of claim 1 wherein Ar and Ar" are selected from the group consisting of 1,4 - phenylene; o-methoxy-1,4-phenylene; and 2,6-naphthenylene; Ar' is selected from the group consisting of 1,4-phenylene; 1,5-naphthalene; 2,6-naphthalene; 4,4'-diphenylene and 4,4'-diphenylene sulfone; $m$ and $n$ is 2 to 4, inclusive, and R is lower alkoxy.

3. A compound of the formula:

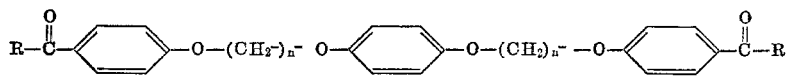

wherein R is lower alkoxy, $n$ is an integer not less than 2 and not more than 6, and the aromatic ring may optionally be substituted in at least one of the free positions, each such substituent being a methyl, ethyl, methoxy, ethoxy, or halogen substituent.

4. The compound of claim 3 wherein R is lower alkoxy, $n$ is 2 to 4 inclusive; and said substituent where present is lower alkoxy.

5. The compound of claim 4 wherein R is methoxy, $n$ is 2 to 4 and said substituent, where present, is methoxy.

6. The compound of claim 4 wherein R is methoxy, $n$ is 2 and the aromatic rings are not substituted.

7. The compound of claim 5 wherein R is methoxy, $n$ is 2 and said substituent is methoxy, said compound having the following structural formula:

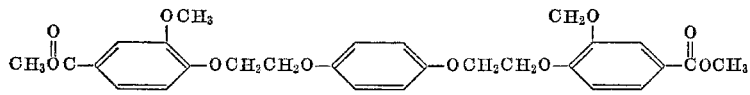

8. The compound of claim 5 wherein $n$ is 4.

9. The compound of claim 8 wherein R is methoxy and said aromatic rings are not substituted.

References Cited

UNITED STATES PATENTS

| | | | |
|---|---|---|---|
| 2,744,129 | 5/1956 | Caldwell | 260—470 |
| 3,116,323 | 12/1963 | Canallini et al. | 260—470 |
| 2,630,454 | 3/1953 | Bock | 260—520 |
| 3,385,863 | 5/1968 | Wick et al. | 260—544 |

JAMES A. PATTEN, Primary Examiner

R. S. WEISSBERG, Assistant Examiner

U.S. Cl. X.R.

260—75 N, 75 R, 75 H, 75 S, 456 P, 470, 473 F, 516, 517, 520, 521 R, 544 F, 544 M, 559 H

PO-1050
(5/69)

UNITED STATES PATENT OFFICE
CERTIFICATE OF CORRECTION

Patent No. 3,646,108                     Dated February 29, 1972

Inventor(s) Edward Barry Jones and John Mather

It is certified that error appears in the above-identified patent and that said Letters Patent are hereby corrected as shown below:

In the Abstract, line 40, "$-CH_2H_5$" should read -- $-C_2H_5$ --.

Column 2, Scheme I should read --

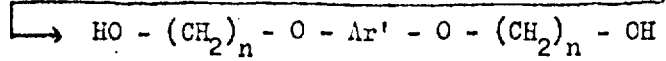
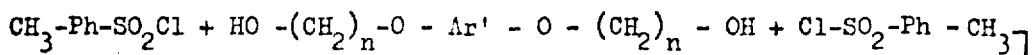
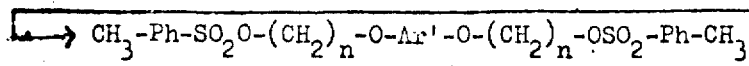
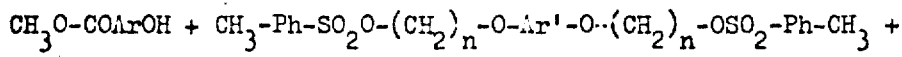
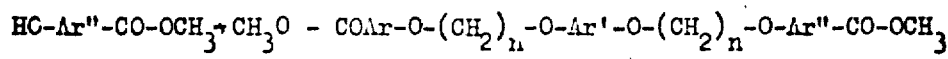

--.

Column 2, Scheme II, formula 4.2 first part should read --

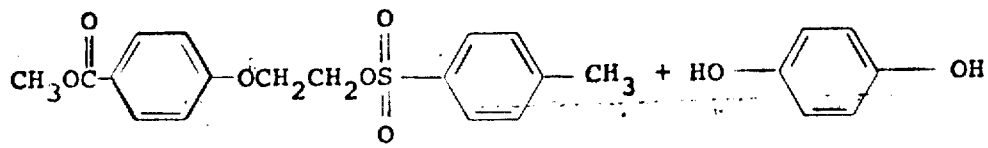

--.

Column 3, line 35, "Ar, Ar', A", n," should read -- Ar, Ar', Ar", n, --.

PO-1050
(5/69)

UNITED STATES PATENT OFFICE
CERTIFICATE OF CORRECTION

Patent No. 3,646,108        Dated February 29, 1972

Inventor(s) Edward Barry Jones and John Mather

It is certified that error appears in the above-identified patent and that said Letters Patent are hereby corrected as shown below:

Column 4, line 30, the formula should read --

Column 4, line 56, after the words "optical brighteners" a line was omitted which should read -- and substances designed to improve substantivity to- --.

Column 6, line 75, "M.P. 215-215°C." should read -- M. P. 215-216°C. --.

Column 7, Example B8, the formula should read --

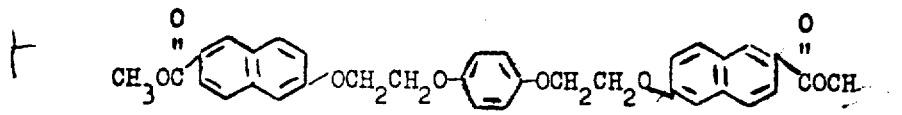

Column 8, lines 47 and 48, the word "recrystallized" should be -- crystallized --.

Column 8, Example B10, the formula should read --

Column 8, Example B11, the formula should read --

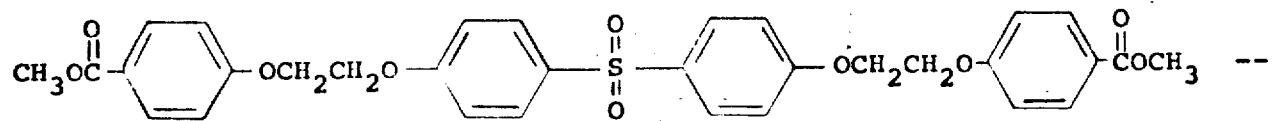

PO-1050
(5/69)

UNITED STATES PATENT OFFICE
CERTIFICATE OF CORRECTION

Patent No. 3,646,108      Dated February 29, 1972

Inventor(s) Edward Barry Jones and John Mather

It is certified that error appears in the above-identified patent and that said Letters Patent are hereby corrected as shown below:

Column 8, line 71, "(2.5 parts)" should read -- (23.5 parts) --.

Column 8, line 72, "179C." should read -- 179°C. --.

Column 10, line 10, "phenoxy ethoxy benzene" should read
-- phenoxy ethoxy) benzene --.

Column 10, Example C3, should read --

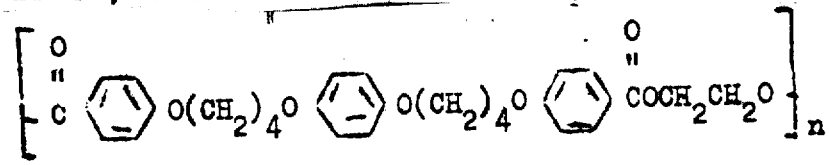

Column 10, line 73, after the word "antioxidant" the following words were omitted -- bis(-2-hydroxy-3-∝-methylcyclohexyl-5-methyl) phenyl --.

Column 11, line 29, "phenoxy ethoxy naphthalene" should read
-- phenoxy ethoxy) naphthalene -- .

Column 11, line 68, "phenoxy ethoxy naphthalene" should read
-- phenoxy ethoxy) naphthalene --.

Column 12, line 2 of Example 9C, "phenoxy ethoxy naphthalene" should read -- phenoxy ethoxy) naphthalene --.

Column 13, Example C14, the formula should read --

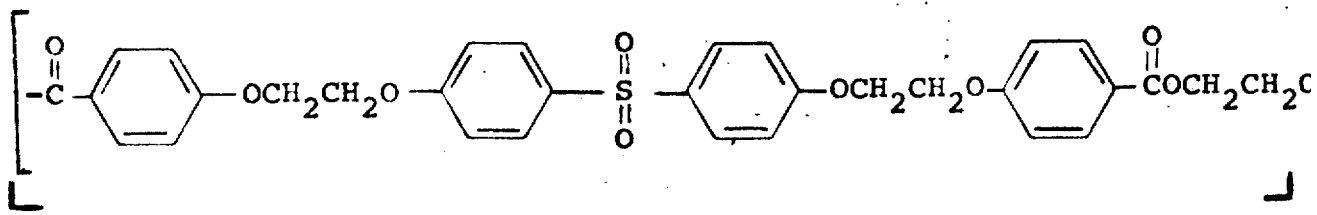

PO-1050
(5/69)

UNITED STATES PATENT OFFICE
CERTIFICATE OF CORRECTION

Patent No. 3,646,108                     Dated February 29, 1972

Inventor(s) Edward Barry Jones and John Mather

It is certified that error appears in the above-identified patent and that said Letters Patent are hereby corrected as shown below:

Column 13, Example C12, the formula should read --

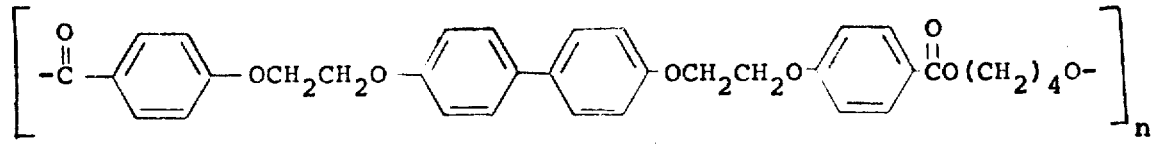

--.

Column 15, Example E1, the formula should read --

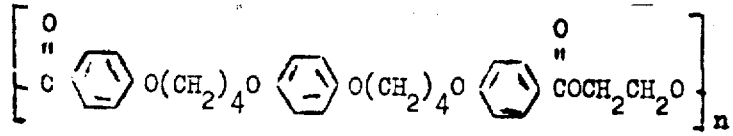

Column 16, Example E3, the second formula should read --

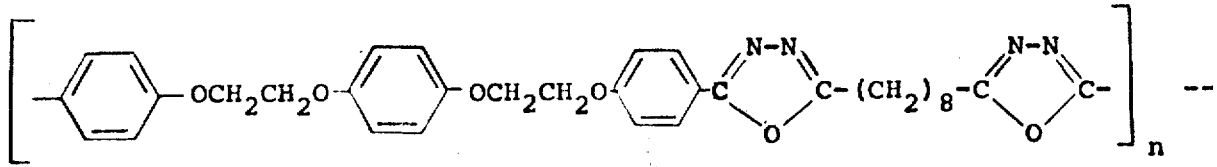

--

Column 18, line 8, "13.2%" should be -- 13.3% --.

Column 18, line 17, the word "red" should be -- rod --.

Column 18, line 39, the word "carbonyi" should be -- carbonyl --.

PO-1050
(5/69)

UNITED STATES PATENT OFFICE
CERTIFICATE OF CORRECTION

Patent No. 3,646,108   Dated February 29, 1972

Inventor(s) Edward Barry Jones and John Mather   - 5 -

It is certified that error appears in the above-identified patent and that said Letters Patent are hereby corrected as shown below:

Claim 1, line 11, the formula should read --

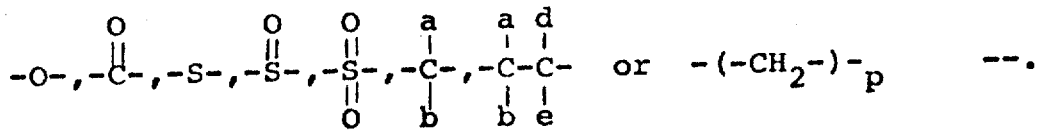

Signed and sealed this 26th day of December 1972.

(SEAL)
Attest:

EDWARD M. FLETCHER, JR.  
Attesting Officer

ROBERT GOTTSCHALK  
Commissioner of Patents